(No Model.) 2 Sheets—Sheet 1.
F. D. TOUCEY.
PISTON ROD PACKING.
No. 441,452. Patented Nov. 25, 1890.
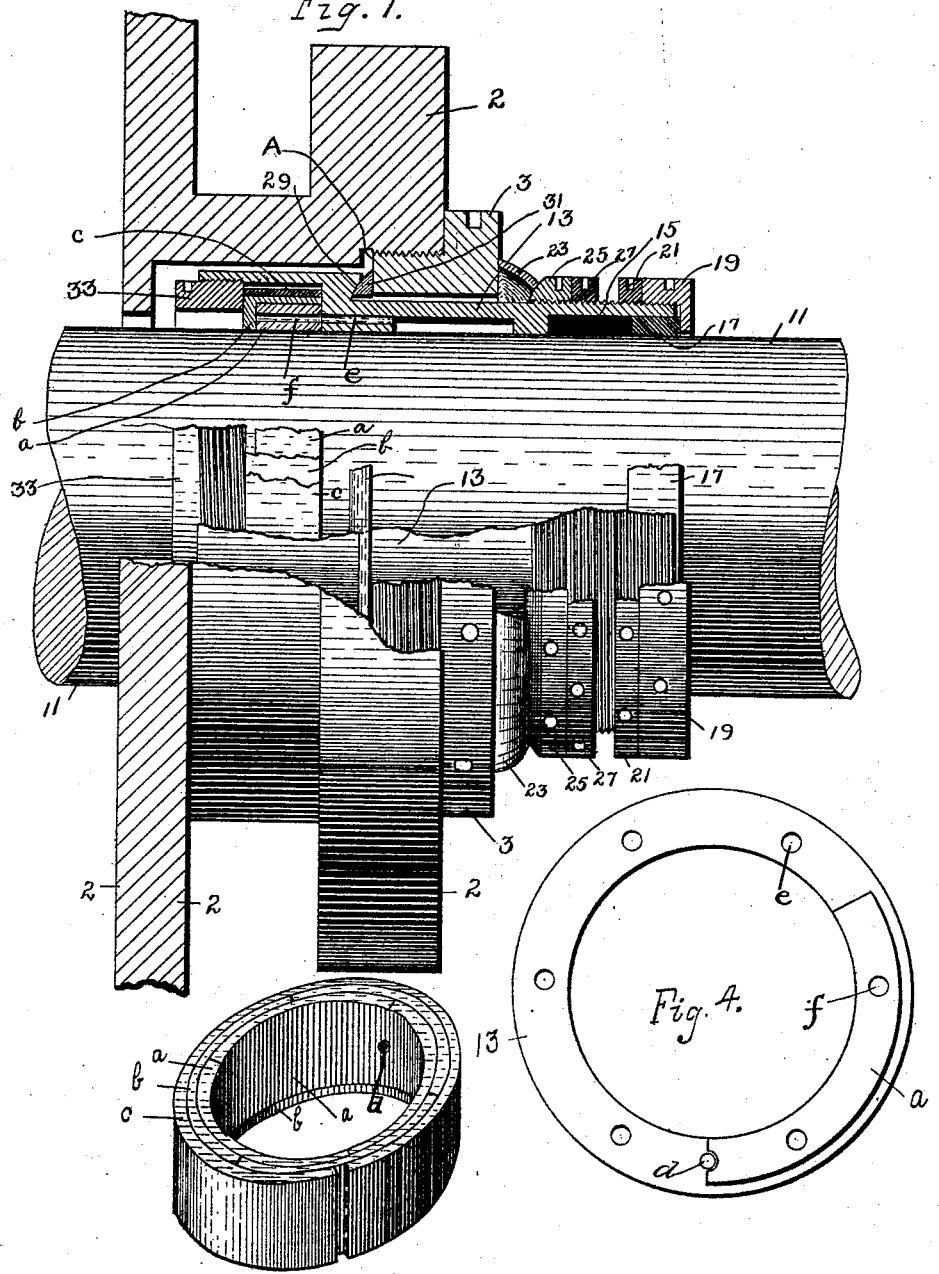
Witnesses.
S. M. Roberts
J. Jessen
Inventor.
Ferris D. Toucey
By Paul & Sorerman Atty's (No Model.) 2 Sheets—Sheet 2.
F. D. TOUCEY.
PISTON ROD PACKING.
No. 441,452. Patented Nov. 25, 1890.
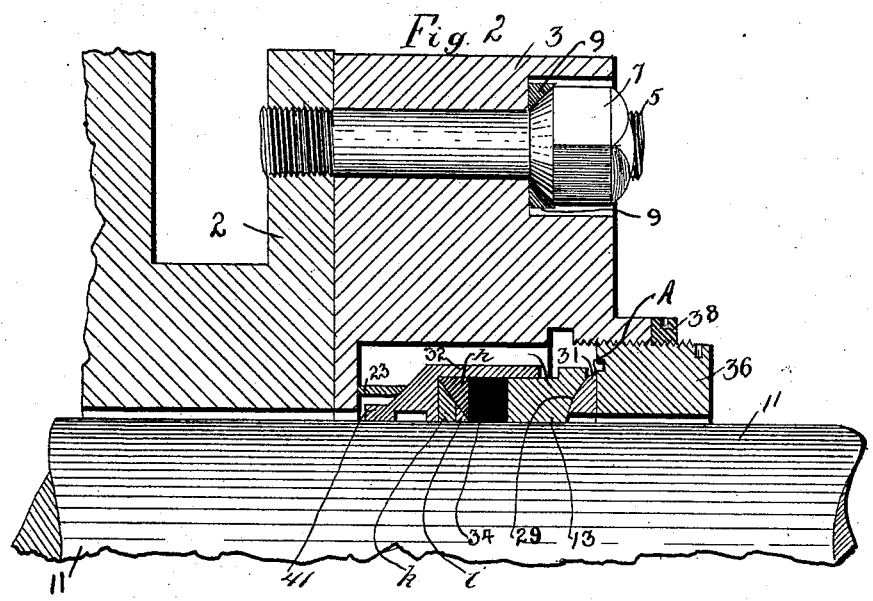
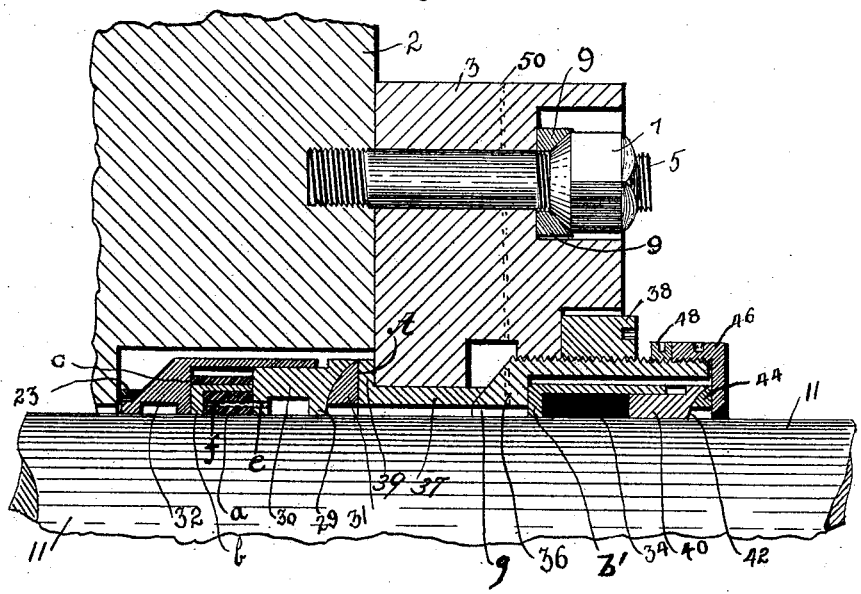
Witnesses
S. W. Roberts
J. Jessen
Inventor
Ferris D. Toucey
By Paul —— Atty's

UNITED STATES PATENT OFFICE.

FERRIS D. TOUCEY, OF MINNEAPOLIS, MINNESOTA, ASSIGNOR OF TWO-THIRDS TO FRANK DUNHAM AND FREDERICK C. JOHNSON, OF SAME PLACE.

PISTON-ROD PACKING.

SPECIFICATION forming part of Letters Patent No. 441,452, dated November 25, 1890.

Application filed March 4, 1890. Serial No. 342,626. (No model.)

*To all whom it may concern:*

Be it known that I, FERRIS D. TOUCEY, of Minneapolis, in the county of Hennepin and State of Minnesota, have invented certain Improvements in Piston-Rod Packings, of which the following is a specification.

My invention relates to the packing of valve and piston rods or other reciprocating, rotating, or oscillating rods; and its object is to provide an improved packing which will bear with uniform and unvarying pressure upon the rod notwithstanding any changes of its position or any lateral or oscillating movement thereof. Said construction and arrangement also permits the packing to be adjusted readily and easily.

The invention further consists in the construction and combination hereinafter described, and particularly pointed out in the claims.

In the accompanying drawings, forming a part of this specification, Figure 1 is a side elevation and partial section of my improved packing, showing its arrangement in the stuffing-box of the cylinder-head. Fig. 2 is a partial sectional elevation showing the packing arranged in the gland and of a slightly-modified construction. Fig. 3 is a partial sectional elevation showing a slightly-modified construction of packing arranged partially in the gland and partially in the cylinder-head. Fig. 4 is a detail. Fig. 5 is a detail of the packing-rings.

In the drawings, 2 represents a cylinder-head and 3 the gland secured thereto in any suitable manner, as by being screwed into the cylinder-head, as shown in Fig. 1, or by being secured thereto by suitable studs 5, screwed into the cylinder-head, and provided with nuts 7, as shown in Figs. 2 and 3, in which instance I prefer to use a nut 7, having a convex lower face, beneath which is arranged a concave washer 9. This prevents the face of the nut striking unequally upon the face of the gland, and thereby "cocking" the gland, as frequently occurs where a two-studded gland, with nuts having flat faces, is used.

11 represents the piston-rod, which passes through said gland and cylinder-head. A packing-cage is arranged within the cylinder-head or gland, or both, and is provided with means arranged upon the outside of the gland for adjusting the tension of the packing. This adjusting means may be operated without removing the packing or gland, and thereby the tension of the packing may at any time be increased or diminished.

In Fig. 1 I have shown the packing-cage projecting through the gland and provided with a threaded outer surface and with a recess in its outer end. Arranged in this recess is preferably a dust-excluding soft-packing 15 and a packing-thimble 17, that is arranged outside of said soft packing. A cap-nut 19 is arranged upon the end of the cage and holds the thimble 17 in place, said cap-nut being locked in position by means of a set-nut 21. A convex tension-ring 23 is arranged upon the packing-cage, and in Fig. 1 I have shown said ring located outside of and bearing against the outer surface of the gland 3. An adjusting-nut 25 is arranged upon the packing-cage and is adapted to engage and adjust the tension of said ring 23. A set-nut 27 is arranged upon the cage, and by means of it said adjusting-nut may be secured in position. In each instance there is a stationary plane surface A, that is substantially at right angles to the axis of the piston-rod, and is either formed by the gland itself, as in Fig. 1, or upon a separate follower, as in Figs. 2 and 3. A ring 31 is provided, which has one plane surface that rests against the surface A, and a convex surface that engages a corresponding concave surface 29 upon the packing-cage. The joints between the ring 31 and the cage and between said ring and the plane surface A are movable or live joints, one being a convex and concave joint and the other a plane-surface joint. These joints permit both a lateral and an oscillatory movement of the rod without opening the joint. The packing-cage is preferably formed in two parts, between which are arranged suitable packing-rings, which may be of the form shown in either of the figures of the drawings.

In Fig. 1 I have shown the packing-case provided with a movable ring 33, that screws into the inner end of the packing-cage. Within the packing-cage and inside of this ring are arranged the packing-rings. As shown in Figs. 1 and 3, these rings consist of a segmental ring *a*, that is rectangular in cross-section, a segmental L-shaped ring *b* outside thereof, and an eccentric-clasp tension-ring *c* outside of the ring *b*. These rings are shown in detail in Fig. 5, and one section of the ring *a* is shown in Fig. 4. The sections of the rings *a* and *b* are arranged to break joints with each other, and they are prevented from getting out of position by a pin *d*. These rings are arranged within the packing-cage, as described, and the pressure of steam from the cylinders, acting on the flange of the ring *b* and upon the outside of said ring, forces the edges of the ring that are farthest from the cylinder against the wall of the packing-cage, thereby making a close joint, and also forces the inner surfaces of the ring against the piston-rod, against which they are also held by the clasp-ring *c*. If any steam got past the rings and between them and the wall of the packing-cage against which they bear, it would have a tendency to counteract the pressure of the steam upon the other side, and therefore to balance the ring, preventing their being held as tightly against the wall of the cage. To prevent this, I provide the cage with openings *e* and the ring *a* with openings *f*, which communicate with each other, and these openings permit the escape into the space *g* within the cage of any steam that escapes past the ring *b* and that otherwise would be confined between the flange of the ring *b* and ring *a*, or between the edge of the ring *a* and the wall of the cage. This prevents any counterbalancing of these rings by reason of the steam working past them and being held between the rings or between the rings and the cage.

In Fig. 2 I have shown the packing-cage 13 formed in two parts that telescope one into the other, and with a threaded follower 36, that screws into the gland and has upon its inner end the surface A, against which the ring 31 bears. A locking-ring nut 38 is arranged upon the surface of the follower 36, and is adapted to be screwed against the wall of the gland, thereby locking the follower in position. In Fig. 2 I have shown a soft packing 34 arranged within the packing-cage, and I have also shown an outer ring *h*, that is triangular in cross-section, and two inner segmental rings *i* and *k*, that are engaged by the ring *h*. The tension-ring 23 is here shown as arranged within the gland and engaging the inner end of the packing-cage. The inner end of the cage is provided with a beveled or inclined surface, upon which the tension-ring bears. Said inner end of the cage is also provided with a cylindrical projection 41, upon which the ring 23 bears when the cage is being put in position or taken out. By means of the follower 36 the tension upon the packing may be increased or diminished and the rings *k* and *i* may also be brought with greater firmness against the rod, as by increasing the tension upon the packing the triangular ring *h* forces the other rings *k* and *i* more closely against the rod. Where the telescoping packing-cage is used, the friction between the inclosed rings and the cage may be limited by limiting the amount of movement of one part of the cage upon the other. This is accomplished by having the flange upon one part of the cage come in contact with the shoulder upon the other.

The construction shown in Fig. 3 is similar to that shown in Fig. 2, except that I have shown the packing-cage arranged within the cylinder-head and provided with the packing-rings *a* and *b* and the clasp-ring *c*, and the follower 36 is made in two parts. The ring 37, which forms a part of said follower, is provided with an outwardly-projecting flange 39, that is provided with the plane bearing-surface A and also engages with the surface of the gland. The follower 36 is threaded upon its outer surface, and is provided with a locking-ring 38. It also has within it a socket or recess that receives a flange packing-ring *b* and a soft packing 34. A packing-thimble 40, provided with the concave surface 42, bears against the soft packing 34. A ring 44, having a convex surface, engages the thimble 40, and a cap-ring 46, screwed upon the outer surface of the follower 36, engages the ring 44 and holds it in position. A locking-ring 48 is arranged upon the outer surface of the follower 36 and locks the cap-nut 46 in position. I may also provide in each instance an opening 50, extending through the gland, as indicated by dotted lines in Fig. 3, and communicating with the space between the gland and the outer surface of the ring. The object of this opening is to admit atmospheric pressure to this space, and thus to the outer surfaces of the packing-rings, and thus any steam that escapes from the cylinder and passes the packing-ring and gets into this space will be permitted to escape therefrom. By this means I prevent counterbalancing the packing-rings by steam escaping from the cylinder past the packing-rings.

It will be seen that in each instance the tension upon the packing is capable of being increased or diminished by the adjusting device, and that said adjusting device may be operated while the packing is in place.

I claim as my invention—

1. The combination of the rod and the plane surface A, a ring having a plane surface and a convex surface, a packing-cage having a concave surface engaging the convex surface of said ring and inclosing a suitable packing, a suitable tension device, and an adjusting device arranged to be operated from the outside of the gland, substantially as described.

2. The combination, with the rod and the plane surface A at right angles to the axis of said rod, of the ring having a plane surface bearing on said surface A and a convex surface and a packing-cage on said rod having a concave surface engaging the convex surface on said ring, and an adjusting device arranged outside of the gland, substantially as described.

3. The combination, with the rod and the plane surface A, of the ring having a plane surface bearing on said surface A and a convex surface on said ring, a tension device holding said packing-cage in engagement with said ring, and means for adjusting the tension of said tension device, substantially as described.

4. The combination, with the rod and the ring 31, having a convex surface, of the packing-cage having a concave surface engaging said ring, the packing-rings inclosed by said cage, the retaining-nut, and the tension-spring engaging said packing-cage, substantially as described.

5. The combination, with the packing-cage provided with the openings $e$, of the segmental ring $a$, provided with the openings $f$, and the L-shaped ring $b$, inclosed within said packing-cage, substantially as described.

6. The combination, with the cylinder-head, gland, and piston-rod, of the packing-cage inclosing a suitable packing, the tension-ring engaging said packing-cage, the ring 31, having a convex surface engaging said packing-cage and forming a live joint therewith, and the adjustable follower extending into the gland and having a plane surface A, forming a plane live joint with said ring 31, substantially as described.

7. The combination, with the cylinder-head, gland, and piston-rod, of the packing-cage inclosing a suitable packing and having a cylindrical projection at its inner end and a spring tension-ring engaging said packing-cage and adapted to rest upon the cylindrical projection thereon when the packing is being inserted or removed, substantially as described.

8. The combination, with the cylinder-head, gland, and piston, of the packing-cage arranged within said cylinder-head, the ring 31, engaging said packing-cage, and the follower 36, formed in two parts and extending through said gland and adjustable therein and provided with a plane surface A at its inner end, forming a plane-surface joint with said ring 31, substantially as described.

9. The combination of the packing-cage having the inclined inner end, the tension-ring engaging said end of the packing-cage, and a projection upon said packing-cage upon which said ring is adapted to rest while it is being inserted or removed, substantially as described.

In testimony whereof I have hereunto set my hand this 28th day of February, 1890.

FERRIS D. TOUCEY.

In presence of—
A. C. PAUL,
BESSIE BOOTH.